United States Patent [19]

Glover et al.

[11] Patent Number: 5,001,930
[45] Date of Patent: Mar. 26, 1991

[54] SPEEDOMETER ASSEMBLY

[75] Inventors: Alfred H. Glover, Decatur; Joseph T. Betterton, Arab, both of Ala.

[73] Assignee: Acustar, Inc., Troy, Mich.

[21] Appl. No.: 432,261

[22] Filed: Nov. 6, 1989

[51] Int. Cl.$^5$ .............................. G01P 1/02
[52] U.S. Cl. .............................. 73/493; 73/431; 73/490; 73/518; 116/62.1
[58] Field of Search .............. 73/431, 490, 493, 518, 73/527, 866.5; 116/62.1; 248/904, 27.3

[56] References Cited

U.S. PATENT DOCUMENTS 4,842,425  7/1989  Betterton et al. ............... 384/440
4,866,780  9/1989  Mertz et al. ..................... 381/188
4,939,675  7/1990  Luitje ............................. 364/550
4,939,934  7/1990  Ritzenthaler et al. ............ 73/431

*Primary Examiner*—John Chapman
*Assistant Examiner*—Craig Miller
*Attorney, Agent, or Firm*—Kenneth H. MacLean

[57] ABSTRACT

An improved speedometer assembly of the electronic type which utilizes an electric motor mounted to a frame whereby the motor has an end flange portion supported against the frame by means of at least one swingable gate-like latches which are attached to a stationary support by an integral living hinge portion which provides a force against the edge of the flange.

10 Claims, 1 Drawing Sheet

SPEEDOMETER ASSEMBLY

BACKGROUND OF THE INVENTION

1. Field of Invention

The present invention concerns an improved electronic type speedometer assembly utilizing an electric motor and more specifically to mounting means for the motor by a pivotal latch member resiliently attached by integral living hinge to a stationary support.

2. Description of the Related Art

Previously, all automobile speedometers were mechanically operated devices normally using a rotating cable to effect an angular position of a pointer which overlies an indicia indication face. These have been referred to as analog type instruments. Lately, electronic speedometers have been used which have a screen or the like on which a digital display of vehicle speed is shown. However, a large segment of the public prefers the analog type speedometer with a rotative pointer. This application is concerned with an electronic type speedometer with a motor to position a pointer.

In the subject improved speedometer, a small electric motor having a flange is mounted against a frame with a motor shaft extending therefrom to the pointer. The flange is positioned by means of frame pins extending through flange openings. The flange is secured to the frame by means of pivotal latches attached to frame supports by thinned living hinge portions.

SUMMARY OF THE INVENTION

The subject electronic speedometer uses an electric motor supported by a frame. The motor has an outwardly directed flange portion which engages the surface of the frame. Pins extending from the frame extend through openings in the flange to position the motor. Movement of the flange toward the frame engages its edge with gate portions of a swinging latch. The swinging latch is attached to a stationary portion by a thinned living hinge portion. The natural resiliency of the hinge biases the gate against the edge of the flange to secure the motor.

Further details as well as other advantageous features of a preferred embodiments of this invention are set forth in the remainder of the specification and are shown in the drawings.

IN THE DRAWINGS

FIG. 1 is an elevational view of the speedometer assembly.

FIG. 2 is an elevational view taken along sight line 2—2 in FIG. 1 and looking in the direction of the arrows; and FIG. 3 a fragmentary elevational view of the assembly taken sight line 3—3 in FIG. 2 and looking in the direction of the arrows; and FIG. 4 is an enlarged fragmentary perspective view of one mount for the motor housing; and FIG. 5 is a sectioned view of the mount taken along section line 5—5 in FIG. 3 and looking in the direction of the arrows; and FIG. 6 is a sectioned view of the mount taken along section line 6—6 in FIG. 5 and looking in the direction of the arrows.

DETAILED DESCRIPTION OF AN EMBODIMENT

Figure 1:
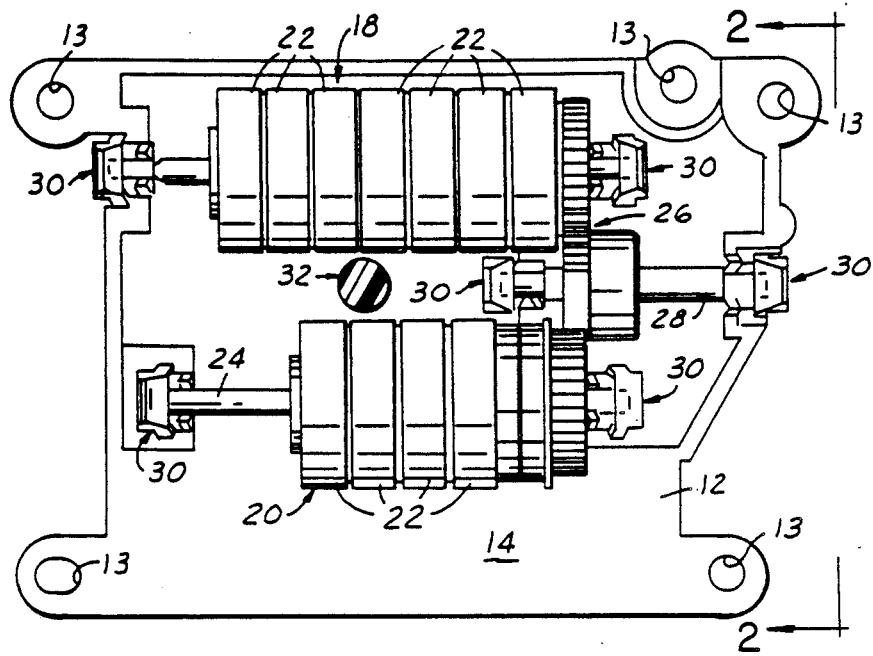
Figure 2:
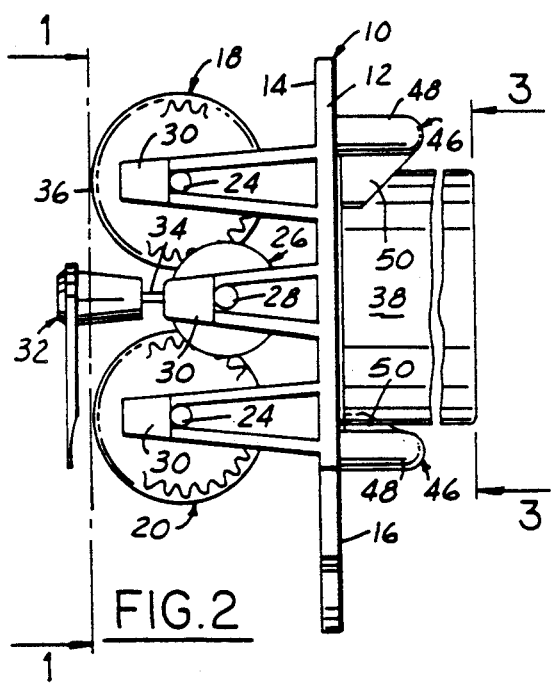
Figure 3:
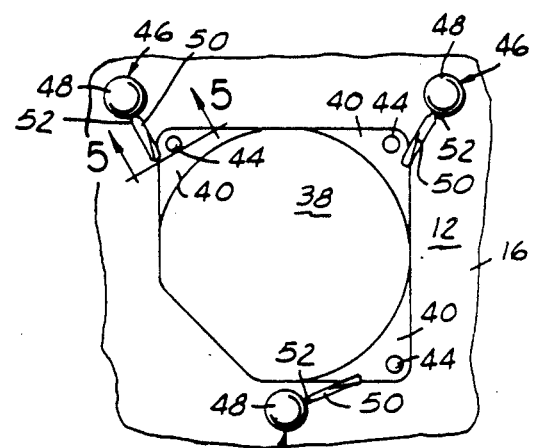

In FIGS. 1–2, a speedometer-odometer assembly 10 for an automobile is illustrated. Assembly 10 includes a generally flat frame member 12, preferably mold formed of elastomeric or plastic material. Frame 12 has several openings or holes 13 therethrough for receiving fasteners or the like to mount the frame to a dashboard structure (not shown). Frame 12 has a front face or surface 14 adapted to face the passenger compartment of the automobile and a rear face 16.

The odometer portion of the assembly 10 is supported in a manner offsetting it with respect to the front surface 14. The odometer includes a total mileage counting assembly 18 and a trip counting assembly 20 which can be selectively reset. The assemblies 18, 20 are constructed conventionally as is known in the odometer art. Both assemblies include a plurality of counting or indicating wheels 22 mounted upon a shaft 24 for rotation. The wheel's circumference or annular surface has digits 0-9 (not shown) spaced evenly thereon as is known in the odometer art. The shafts 24 are rotated in correspondence with the distance the automobile moves by a gear drive means 26 including an input shaft 28.

As perhaps best illustrated in FIG. 2, the end portions of shafts 24, 28 are supported in spaced offset relationship to the surface 14 by mounts 30 which include projecting legs which are molded integrally with the plastic frame 12. These mounts 30 are described in great detail in the recently issued U.S. Pat. No. 4,842,425 also assigned to Chrysler.

Figures 5, 6:
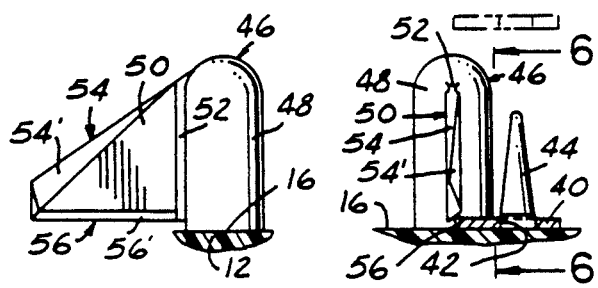

The speedometer portion of the assembly 10 includes a speed indicating pointer member 32 which is attached to the end of a rotatable shaft 34. Shaft 34 extends from the pointer 32 in a direction normal to the plane of flat frame 12. The shaft 34 positions pointer 32 to the left of the odometer assemblies 18 and 20 in FIG. 2. In use, pointer 32 is separated from the odometer assemblies 18, 20 by a flat indicia displaying member. This member displays a circular array of the speedometer information as is common in the speedometer art. It also includes a pair of elongated windows therethrough so that portions of each odometer wheel 18, 20 may be seen by a vehicle operator as is also common in the odometer art. The planar position of this display member is indicated by broken line 36 in FIG. 2. The shaft 34 of the speedometer portion of assembly 10 extends through an opening (not visible in the drawings) in the frame 12. The shaft projects from an electric motor 38 which is supported on the rear side of frame 12 as shown in FIG. 2. Motor 38 may be a stepper type which receives a speed related signal from a transducer (not shown) for positioning the shaft 34 and pointer 32 in an appropriate position relative to the indicia on the display member 36. Motor 38 has a cover or housing with outwardly turned flange means 40 extending from a cylindrical body portion. The flange 40 has at least one but preferably several small openings 42 therethrough as seen in FIG. 5. Openings 42 are positioned in the flange to receive corresponding pins 44 which are molded integrally with the frame 12. Pins 44 extending rearwardly (to the right in FIG. 2) from the surface 16 and have a cylindrical portion adjacent frame 12 as shown in FIG. 5. Outwardly from the cylindrical portion, the pins 44 have a tapered configuration. The movement of the openings 42 over the pins 44 guide and position the motor 38 against the surface 16 of the frame 12 during a mounting action of the motor to the frame.

Figure 4:
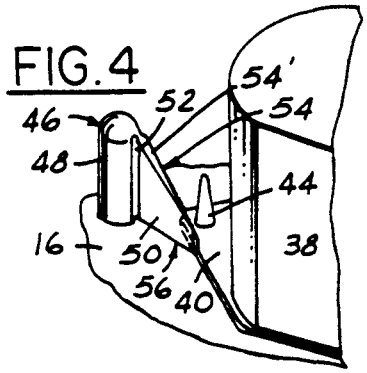

The above described operation accurately positions the motor 38. However, once positioned, other means are necessary to secure the motor 38 to the frame 12. For this purpose, flange 40 is engaged by a plurality of swingable or pivotal latch members 46. Latch members 46 include an elongated post portion 48 for support. Post 48 extends normally from face 16 of the frame 12 and are preferably molded integrally with respect to the frame 12. In turn, the post 48 is integrally attached to a swingable or pivotal gate portion 50 by a thinned living hinge portion 52. The gate portion 50 is extends radially outward from the post 48 and may be deflected in a rotational manner about the living hinge 52. The outer edge 54 of the gate portion 50 which is furthest from surface 16 extends obliquely from the outer end of the post 48 toward the frame surface 16 as best seen in FIG. 6. This edge portion 54 is configured with an inclined surface 54' as best seen in FIGS. 5 and 6. As the motor flange 40 moves toward surface 16, the peripheral edge of flange 40 engages the inclined surface 54' which forces the gate portion 50 to pivot outwardly away from the motor 38 (substantially clockwise in FIG. 4). This pivotally movement of gate 50 is permitted by flexing of the living hinge portion 52. Resultantly, the flange portion 40 may move into overlying relation to the surface 16. The lower edge 56 of gate portion 50 nearest frame surface 16 is configured with an inclined or oblique surface or edge 56' as best shown in FIG. 5. Note that the spacing between edge 56 and surface 16 is less than the thickness of flange 40. The inclined surface 56' engages the top corner of the flange edge to tightly secure the flange 40 against surface 16. Also, the inclined surface 56' tends to press the flange and motor 38 laterally so that portions of flange 40 that define opening 42 bear against the pin 44 as seen in FIG. 5. Resultantly, a frictional force is developed therebetween which tends to secure flange 40 to frame 12. The natural resiliency of the living hinge 52 provides the inward force of gate 50 against flange 40.

Although only on embodiment of this invention is illustrated in the drawings and described in detail, it should be clear that several modifications or design changes may be made without the resultant structure falling outside the scope of the invention as claimed hereafter.

What is claimed is:

1. In an automobile type speedometer assembly which utilizes an electric motor to position speed indicating means such as a rotatable pointer, an improved motor mounting means to secure the motor to a stationary frame member, the improvement comprising: a motor flange extending outward from the motor to a peripheral edge portion thereof, the motor flange adapted to abut a surface of the frame in an overlying relationship; means for guiding the motor and flange toward the frame into a desired position; latch means for engaging the flange's peripheral edge portion including a post-like support structure which projects away from the plane of the frame, the post-like support being spaced slightly outwardly from the peripheral edge portion of the motor flange; the latch means further having a movable gate-like blade extending laterally from the post-like support and obliquely with respect the flange's peripheral edge portion; the post-like support and gate-like blade being integrally connected by a hinge portion, the hinge portion being thinner than the adjacent blade so that the blade is yieldably pivotal thereabout in response to engagement of the flange's peripheral edge portion with one edge of the blade as the motor flange is moved toward the frame; an opposite second edge portion of the blade engaging and overlying the peripheral edge portion of the motor flange once the motor flange attains its final abutting position with the frame.

2. The speedometer assembly set forth in claim 1 in which the guiding and positioning means between the frame and the motor flange includes at least one pin extending substantially normal to the plane of the frame and openings in the flange through which the pins move.

3. The speedometer assembly set forth in claim 1 in which the one edge of the blade extends from the outward end of the post-like support structure obliquely inward toward the frame whereby the peripheral edge portion of the motor flange may contact the one edge and readily slide therealong as the motor and flange move toward the frame.

4. The speedometer assembly set forth in claim 3 in which the one edge of the blade has an inclined surface with respect to the plane of the blade for smoothing the sliding interaction between the motor flange and the one edge.

5. The speedometer assembly set forth in claim 1 in which the opposite second edge of the blade has an inclined surface whereby when the motor and flange are moved against the frame, the inclined surface bears against a corner of the peripheral edge portion of the flange.

6. A speedometer assembly for an automobile, comprising: a generally flat frame member with one of its side surfaces used as a mounting surface; an electric motor with a flange at one end portion adapted to abuttingly overlie the mounting surface of the frame, the motor flange having an outwardly positioned peripheral edge; a pin member extending upwardly from the mounting surface; an aperture through the motor flange corresponding to the pin whereby movement of the motor and flange toward the frame extends the pin through the aperture to position the motor over the frame; latch means for engaging the peripheral edge of the flange including a post-like support structure which projects away from the one side surface of the frame member, the post being spaced slightly laterally outward from the peripheral edge of the motor flange; the latch means further having a movable gate-like blade extending laterally from the post and obliquely with respect to the flange's peripheral edge; the post-like support and gate-like blade being integrally connected by a portion of the blade which acts as a hinge, the hinge portion being thinner than the adjacent portions of the blade so that the blade is yieldably pivotal thereabout in response to engagement of the motor flange with one edge of the blade as the motor and flange are moved toward the frame; a second edge of the blade opposite the first engaging and partially overlying the peripheral edge of the flange once the motor and flange attain final abutting position whereby the flange overlies the frame.

7. The speedometer assembly set forth in claim 6 in which the guiding and positioning means between the frame and the motor flange includes at least one pin extending substantially normal to the plane of the frame and openings in the flange through which the pins move.

8. The speedometer assembly set forth in claim 6 in which the one edge of the blade extends from the outward end of the post-like support structure obliquely inward toward the frame whereby the peripheral edge of the motor flange may contact the one edge and readily slide therealong as the motor and flange move toward the frame.

9. The speedometer assembly set forth in claim 8 in which the one edge of the blade has an inclined surface with respect to the plane of the blade for smoothing the sliding interaction between the motor flange and the one edge.

10. The speedometer assembly set forth in claim 6 in which the opposite second edge of the blade has an inclined surface whereby when the motor and flange are moved against the frame, the inclined surface bears against a corner of the peripheral edge of the flange.

* * * * *